J. S. DETWILER.
GRINDING MILLS.
No. 188,783. Patented March 27, 1877.
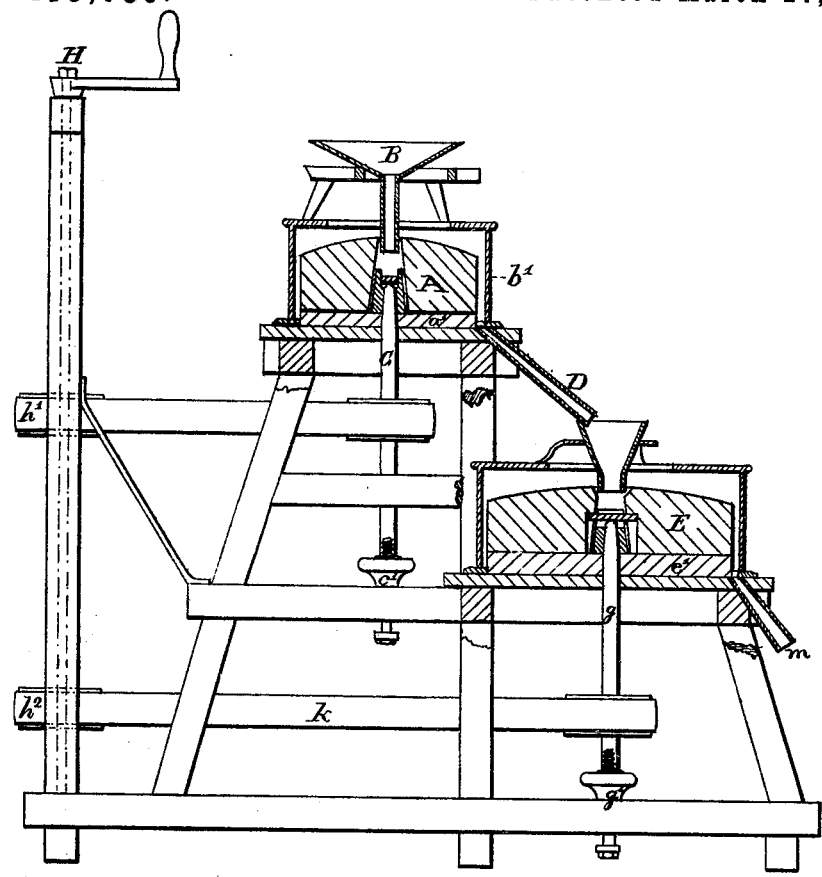
Witnesses
John F. Grant.
D. Louis Shivers.
Inventor.
John S. Detwiler
per Edw Brown
attorney.

UNITED STATES PATENT OFFICE.

JOHN S. DETWILER, OF PHILADELPHIA, PENNSYLVANIA.

IMPROVEMENT IN GRINDING-MILLS.

Specification forming part of Letters Patent No. 188,783, dated March 27, 1877; application filed September 12, 1876.

*To all whom it may concern:*

Be it known that I, JOHN S. DETWILER, of 1527 Franklin street, Philadelphia, Pennsylvania, have invented new and useful Improvements in Grinding Wheat, of which the following is a specification, reference being had to the accompanying drawing.

The invention consists in passing the wheat first through a pair of ordinary burr-stones, rather smaller in diameter, set farther apart, and running at a slower speed than usual; the partially-ground wheat then passing directly into a second pair of burrs of larger diameter, and run at a lower speed than the first pair.

The drawing represents a vertical section of a machine embodying my improvements.

A $a'$ are the upper pair of stones. B is the hopper; $b'$, the casing; C, the spindle carrying the upper millstone, and $c'$ is the screw for adjusting the distance apart of the stones. D is a spout conveying the partially-ground wheat into the lower pair of stones E $e'$. The spindle carrying the upper millstone is shown by $g$, and the adjusting-screw by $g'$. The stone A is driven by a pulley, $h^1$, upon an upright shaft, H, the stone E being driven by a belt, $k$, from the pulley $h^2$ in a similar manner. The upper stone A is a burr about three and a half feet in diameter. It is speeded to about one hundred and fifty revolutions per minute, and is set farther from the under millstone than customary, so that more than double the quantity of wheat can pass through in a partially ground state than would pass through an ordinary pair of burrs when making flour in the usual way. The partially-ground wheat passes down the spout D direct into the lower pair of burrs E $e'$. The stone E is about five feet in diameter, and makes about one hundred revolutions per minute. It is set close to the under stone $e'$, and completes the grinding. The flour passes out at the spout $m$.

The advantages derived from the use of this invention are important. Two pair of burrs, each pair making flour in the usual way, would grind about sixteen to twenty bushels of wheat per hour. The two pair of stones, constructed and operating as herein described, will grind from twenty-five to thirty bushels per hour, with a less expenditure of power. I also obtain a flour of better grade from the same wheat.

Having described my invention, what I claim as new, and wish to secure by Letters Patent of the United States, is—

The combination of a pair of stones set to grind coarse, with a second pair of stones of larger diameter set to grind fine, and run at a lower speed than the upper and smaller pair of stones, the partially-ground grain falling from the upper to the lower stones, and passing from the latter in the form of flour, substantially as herein specified.

JOHN S. DETWILER.

Witnesses:
 EDWD. BROWN,
 JOHN F. GRANT.